(12) United States Patent
Schroeder

(10) Patent No.: US 7,236,427 B1
(45) Date of Patent: Jun. 26, 2007

(54) VESSEL HULL TRANSDUCER MODULAR MOUNTING SYSTEM

(75) Inventor: Terrence K. Schroeder, Bernardsville, NJ (US)

(73) Assignee: SWCE, Bernardsville, NJ (US)

( * ) Notice: Subject to any disclaimer, the term of this patent is extended or adjusted under 35 U.S.C. 154(b) by 281 days.

(21) Appl. No.: 11/078,901

(22) Filed: Mar. 11, 2005

Related U.S. Application Data

(60) Provisional application No. 60/660,225, filed on Mar. 10, 2005, provisional application No. 60/552,769, filed on Mar. 12, 2004.

(51) Int. Cl.
*H04R 1/02* (2006.01)
(52) U.S. Cl. ........................... 367/188; 367/173
(58) Field of Classification Search ............... 367/165, 367/173, 188
See application file for complete search history.

(56) References Cited

U.S. PATENT DOCUMENTS

| | | | | |
|---|---|---|---|---|
| 3,039,078 | A | * | 6/1962 | Wilcoxon ............... 367/12 |
| 3,753,219 | A | * | 8/1973 | King, Jr. ............... 367/173 |
| 4,156,228 | A | * | 5/1979 | Heckman ............... 367/173 |
| 4,815,048 | A | * | 3/1989 | Boucher et al. ......... 367/173 |
| 4,897,824 | A | * | 1/1990 | Stokes ................. 367/173 |
| 5,353,263 | A | * | 10/1994 | Pakker et al. .......... 367/173 |
| 5,602,801 | A | * | 2/1997 | Nussbaum et al. ....... 367/165 |
| 5,878,000 | A | * | 3/1999 | Dubois ................ 367/188 |
| 6,019,333 | A | * | 2/2000 | Waller ................. 248/295.11 |
| 6,046,963 | A | * | 4/2000 | Glenning .............. 367/188 |
| 6,094,402 | A | * | 7/2000 | Cooper et al. .......... 367/188 |

2002/0067662 A1    6/2002  Carney

OTHER PUBLICATIONS

Cook, Melvin A., "The Science of High Explosives", New York: Reinhold Publishing Corporation, 1958.
Cook, Melvin A., "The Science of Industrial Explosives", Utah: IRECO Chemicals, 1974.
Walters, W.P. and Zukas, J.A., "Fundamentals of Shaped Charges",Maryland: CMCPress, 1998.
Walters, W.P., and Zukas, J.A., "Explosive Effects and Applications", New York: Springer-Verlag New York, Inc., 1998.
Kirkwood, John Gamble, "John Gamble Kirkwood Collected Works, Shock and Detonation Waves", New York: Gordon and Breach, Science Publishers, Inc., 196.7.
Kolsky, H., "Stress Waves in Solids", New York: Dover Publications, Inc., 1963.
Fickett, W. and Davis, W.C., "Detonation: Theory and Experiment", New York: Dover Publications, Inc., 1979.
Cole, R.H., "Underwater Expolsions", New York: Dover Publications, Inc., 1948.
Mader, C.L., "Numerical Modeling of Detonations", California: Univeristy of California Press, 1979.
Mader, C.L., "Numerical Modeling of Explosives and Propellants Second Edition", New York: CRC Press, 1998.

(Continued)

*Primary Examiner*—Dan Pihulic
(74) *Attorney, Agent, or Firm*—Mathews, Sheperd, McKay & Bruneau, P.A.

(57) ABSTRACT

A vessel hull transducer modular mounting system enables transducers to be replaced and upgraded without necessitating the further modification of the hull and thus not necessitating the dry-docking of the vessel. A further feature includes the ability to reduce and dampen acoustic shock impact on the transducer. Another feature includes the ability to extend and retract the transducer which can operate in bottom scan, forward looking, side scan, searchlight, and sweep modes.

25 Claims, 8 Drawing Sheets

OTHER PUBLICATIONS

Cooper, P.W. and Kurowski, S.R., "Introduction to the Technology of Explosives", New York: VHC Publishers, Inc., 1996.
Cooper, P.W., "Explosives Engineering", New York: VCH Publishers, Inc, 1996.
Wang, X., "Emulsion Explosives", Beijing; Metallurgical Industry Press, 1994.
Siegel, B. and Schieler, L., "Energetics of Propellent Chemistry", New York: John Wiley & Sons Inc., 1964.
Kit, B and Evered, D., "Rocket Propellant Handbook", New York: The Macmillan Company, 1960.
Nielsen, Arnold T., "Nitrocarbons", New York: VHC Publishers, Inc., 1995.
Pelter et al., "Borane Reagents", London: Academic Press Limited, 1988.
Roy, G.D., "Advances in Chemical Propulsion, Science to Technology", Florida: CRC Press LLC, 2002.
Kubota, N., "Propellants and Explosives, Thermochemical Aspects of Combustion", Weinheim: Wiley-VCH GmbH, 2002.
Lipanov, A.M., "Theory of Combustion of Powder and Explosives", New York: Nova Science Publishers, Inc., 1996.
Machacek, O., "Application of Demilitarized Gun and Rocket Propellants in Commercial Explosives", Boston: Kluwer Academic Publishers, 2000.
Köhler, J. and Meyer, R., "Explosives, Fourth revised and extended edition", Weinheim: VCH Verlagsgesellschaft mbH, 1993.
Meyer et al., "Explosives, Fifth, Completely Revised Edition", Weinheim: Wiley-VCH Verlag GmbH, 2002.
Suceska, M., "Test Methods for Expolsives", New York: Springer-Verlag, 1995.
Davis, T.L., "The Chemistry of Powder and Explosives", Nevada: Angriff Press, 1944.
International Society of Explosives Engineers, "Blasters' Handbook, 17th Edition", Ohio: International Society of Explosives Engineers,Inc., 1998.
Lanchaster, R., "Fireworks, Principles and Practice, 3rd Edition", New York: Chemical Publishing Co., Inc., 1998.
Conkling, J.A., "Chemistry of Pyrotechnics, Basic Principles and Theory", New York: Marcel Dekker, Inc., 1985.
Yinon, J., "Forensic and Environmental Detection of Explosives", New York: John Wiley & Sons, LTD, 1999.
Yinon, J. and Zitrin, S., "Modern Methods and Applications in Analysis of Explosives", New York: John Wiley & Sons, LTD, 1993.
Beveridge, A., "Forensic Investigation of Explosions", London: Taylor & Francis Ltd., 1998.
Bulson, P.S., "Explosive Loading of Engineering Structures; A history of research and a review of recent developments.", New York: E & FN Spon, 1997.
Anderson, T.L., "Fracture Mechanics, Fundamentals and Applications, Second Edition", New York: CRC Press, Inc., 1995.
Whittaker et al., "Rock Fracture Mechanics, Principles, Design and Applications", New York: Elsevier Science Publishers B.V., 1992.
Charlez, P.A., "Rock Mechanics, Theoretical Fundamentals, vol. I", Texas: Gulf Publishing Company, 1991.
Zangwil, A., "Physics at Surfaces", New York: Cambridge University Press, 1988.
Wall, F.T., "Chemical Thermodynamics, A Course of Study, Second Edition", San Francisco: W.H. Freeman and Company, 1958, 1965.
Kreith, F., ed. "The CRC Handbook of Thermal Engineering", New York: CRC Press LLC, 2000.
Castellan, G.W., "Physical Chemistry", London: Addison-Wesley Publishing Company, Inc., 1964.
Atkins, P.W., "Physical Chemistry, Third Edition", New York: W.H. Freeman and Company, 1978, 1982, 1986.
Raemer, H.R., "Radar Systems Principles", New York, CRC Press LLC, 1997.
Taylor, J.D., ed. "Ultra-Wideband Radar Technology", New York: CRC Press LLC, 2001.
Mahafza, B.R., "Radar Systems Analysis and Design Using MATLAB", New York: Chapman & Hall/CRC, 2000.
Franceschetti, G. and Lanari, R., "Synthetic Perture Radar Processing", New York: CRC Press LLC, 1999.
Mahafza, B.R., "Introduction to Radar Analysis", New York: CRC Press LLC, 1998.
Sanchez, J. and Canton, M.P., "Space-Image Processing", New York: CRC Press LLC, 1999.
Sabins, F.F, "Remote Sensing, Principles and Interpretation, Second Edition", New York: W.H. Freeman and Company, 1978.
Kreyszig, E., "Advanced Engineering Mathematics, Third Edition", New York: John Wiley and Sons, Inc., 1962, 1967, 1972.
Rabenstein, A.L., "Introduction to Ordinary Differential Equations", New York: Academic Press, Inc., 1966.
Adeli, H. and Soegiarso, R., "High-Performance Computing in Structural Engineering", New York: CRC Press LLC, 1999.
Lancaster, P and Šalkauskas, K., "Curve and Surface Fitting, An Introduction", New York: Academic Press, 1986.
Lyche, T. and Schumaker, L., "Mathematical Methods in Computer Aided Geometric Design", New York: Academic Press, 1989.
Farin, G., "Curves and Surfaces for Computer Aided Geometric Design, A Practical Guide", New York: Academic Press, Inc., 1990.
Bu-Qing, S. and Ding-Yuan, L., "Computational Geometry, Curve and Surface Modeling", New York: Academic Press, Inc., 1989.
Beltrami, E., "Mathematics for Dynamic Modeling", New York: Acadmic Press, Inc., 1987.
Korn, G.A., "Interactive Dynamic System Simulation", New York: McGraw-Hill Book Company, 1989.
Sedgewick, R., "Algorithms", Reading, Massachusetts: Addison-Wesley Publishing Company, Inc., 1983.
Kohn, M.C., "Practical Numerical Methods Algorithms and Programs", New York: Macmillan Publishing Company, 1987.
Pearson, C.E., "Numerical Methods in Engineering and Science", New York: Van Nostrand Reinhold Comapny, Inc., 1986.
Wells, D.A., "Schaum's Outline of Theory and Problems of Lagrangian Dynamics with a treatment of Euler's Equations of Motion, Hamilton's Equations and Hamilton's Principle", New York: Schaum's Outline Series, McGraw-Hill Book Company, 1967.
Spiegel, M.R., "Schaum's Outline of Theory and Problems of Vector Analysis and an Introduction to Tensor Analysis", New York, Schaum Publishing Company, 1959.
Hughes, O. F., "Ship Structural Design, a Rationally-Based, Computer-Aided Optimization Approach", Jersey City, New Jersey: The Society of Naval Architects and Marine Engineers, 1988.
Saunders, H.E., "Hydrodynamics in Ship Design, vol. 1", New York: The Society of Naval Architects and Marine Engineers, 1957.
Saunders, H.E., "Hydrodynamics in Ship Design, vol. 2", New York: The Society of Naval Architects and Marine Engineers, 1957.
Saunders, H.E., "Hydrodynamics in Ship Design, Author's Notes for vol. 3 on Maneuvering and Wavegoing", NewYork: The Society of Naval Architects and Marine Engineers, 1965, second printing 1982.
Lewis, E.V., ed., "Principles of Naval Architecture, Second Revision, vol. 1, Stability and Strength", New York: TheSociety of Naval Architects and Marine Engineers, 1988.
Lewis, E.V., ed., "Principles of Naval Architecture, Second Revision, vol. II, Resistance, Propulsion and Vibration", Jersey City, New Jersey: The Society of Naval Architects and Marine Engineers, 1988.
Lewis, E.V., ed., "Principles of Naval Architecture, Second Revision, vol. III, Motions in Waves and Controllability",Jersey City, New Jersey: The Society of Naval Architects and Marine Engineers, 1989.
Taggart, R., ed., "Ship Design and Construction", New York: The Society of Naval Architects and Marine Engineers, 1980.
Allmendinger, E., ed., "Submersible Vehicle Systems Design", Jersey City, New Jersey: The Societyof Naval Architects and Marine Engineers, 1990.
Harrington, R.L., ed., " Marine Engineering", New York: The Society of Naval Architects and Marine Engineers, 1971.
Lide, D.R., ed., "CRC Handbook of Chemistry and Physics", New York: CRC Press, Inc., 2000.
Airmar Technology Corporation, "Piezoflex Polymer Tranducers, Open Opportunities" pp. 1-6, Milford, New Hampshire 03055-4613 USA.
Airmar Technology Corporation, "Airman Product Catalog 2000-2001" pp. 1-50, Milford, New Hampshire 03055-4613 USA.
Airmar Technology Corporation, "Airman Product Catalog" pp. 237-267, Milford, New Hampshire03055-4613 USA.

* cited by examiner

US 7,236,427 B1

VESSEL HULL TRANSDUCER MODULAR MOUNTING SYSTEM

CROSS REFERENCES TO RELATED APPLICATIONS

This application claims the benefit under 35 U.S.C. 119(e) of U.S. Provisional Application Ser. No. 60/552,769, entitled Vessel Hull Transducer Modular Mounting System, filed on Mar. 12, 2004, and United States Provisional Application Ser. No. 60/660,225, entitled Vessel Transducer Modular Mounting System, filed on Mar. 10, 2005.

FIELD OF INVENTION

The present invention relates to vessel hulls and more particularly to the mounting of transducers.

BACKGROUND OF THE INVENTION

Transducers, such as acoustic transducers are employed by a vessel for mapping and locating. Transducers direct a number of streams of energy, such as sonar or other pulsed energy towards the bottom of the water while the vessel transverses the location. The transducer receives reflected signals from the water bottom, or an intervening object (such as fish, a diver, torpedo or submarine). The raw signal is translated and processed into a map of the water bottom, and/or the contents of the water. The systems are sometimes integrated with a navigational and guidance system, utilizing global positioning satellite (GPS) navigational technology, to provide accurate data and information.

In the past, transducers were hung over the side of or behind a vessel. This system has the disadvantage that the transducer is subject to noise from the vessel's engine and the turbulent movement of the water around the transducer and against the hull. Undesirable noise interference compromises the ability of the transducer to provide a clear and highly useable signal. Such mounting is also highly vulnerable to damage from floating objects, impact when docking, concussion from underwater detonation (such as mines) as well as stresses induced by the motion of waves.

More recently, thru-hull mounting of transducers has been utilized as an alternative. They have been typically limited to use with fiberglass and metal hulls, as wood hulls swell and shrink, inducing substantial stress and/or resulting in loss of mounting and waterproof integrity. Thru-hull transducer mountings are primarily retrofitted systems. The hull is cut to an opening sufficiently large to accommodate the transducer, which is then mounted flush with the use of a sealant and an optional isolation bushing. When a fiberglass hull is cut, the opening should be re-glassed and/or sealed in order to retain integrity of the hull near the cut. Changing and/or replacing a transducer frequently necessitates the hull be re-cut and the new or replacement transducer hacked into place. This requires that the vessel be dry-docked.

Most thru-hull transducer installations require a custom cut fairing as nearly all vessels have some dead-rise angle at the mounting location of the transducer. When a fairing and backing block is used to level the transducer the hull is still cut and raises the same concerns. The fairing and backing block are matched to a particular style and type of transducer. At the very minimum they are epoxied into place.

Thru-hull transducer installations result in weakened hull integrity, as well as make the transducers more susceptible to damage. Transducers such as solid-state phased array sonar as well as conventional transducers are damaged at significantly lower pressures than that required to buckle or cause failure in adjacent fiberglass or metal hull plate areas. Small explosive charges which are used for the purpose of blinding a vessel typically generate acoustic wave profiles sufficient to damage the transducer without damaging the hull.

Therefore, there is a need for a vessel hull transducer modular mounting system which enables transducers to be replaced and upgraded without necessitating the further modification of the hull and thus not necessitating the dry-docking of the vessel.

SUMMARY OF THE INVENTION

The present invention is a vessel hull transducer modular mounting system which enables transducers to be replaced and upgraded without necessitating the further modification of the hull and thus not necessitating the dry-docking of the vessel.

A further feature of the present invention includes the ability to reduce and dampen acoustic shock impact on the transducer.

Another feature of the present invention includes the ability to extend and retract the transducer.

BRIEF DESCRIPTION OF THE DRAWINGS

A more complete understanding of the present invention may be obtained from consideration of the following description in conjunction with the drawings in which.

DETAILED DESCRIPTION OF VARIOUS ILLUSTRATIVE EMBODIMENTS

The present invention is a vessel hull transducer modular mounting system which enables transducers to be replaced and upgraded without necessitating the further modification of the hull and thus not necessitating the dry-docking of the vessel. A further feature of the present invention includes the ability to reduce and dampen acoustic shock impact on the transducer. Another feature of the present invention includes the ability to extend and retract the transducer.

Figure 1:
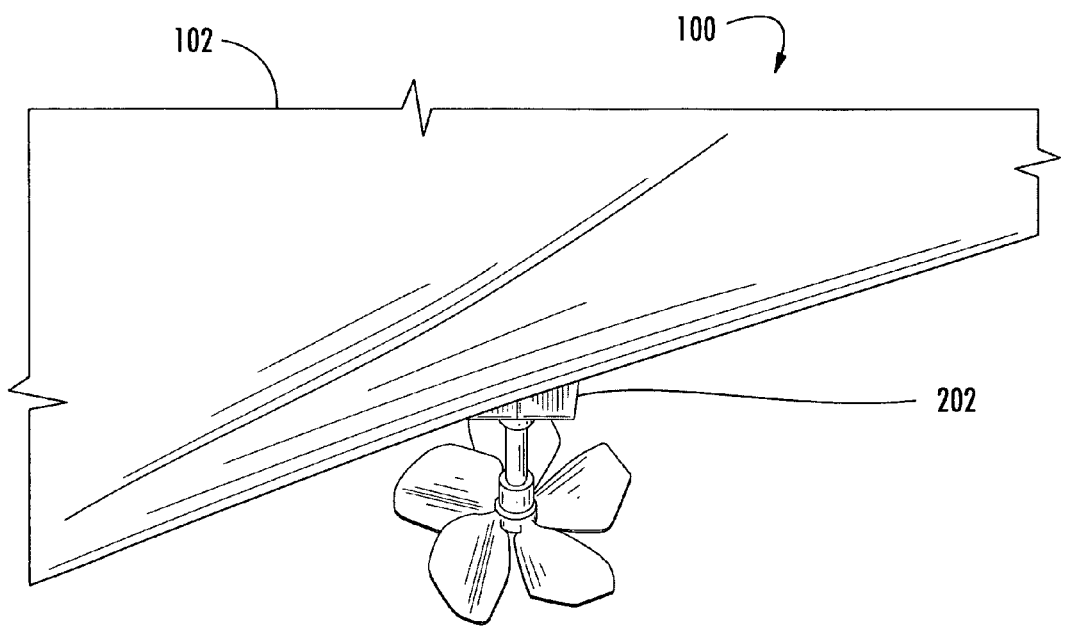
FIG. 1 is a view of a portion of the vessel hull showing the transducer modular mounting system looking from the bow towards the stern under the vessel.

Referring to FIG. 1 there is shown a view of a portion of the vessel hull showing the transducer modular mounting system looking from the bow towards the stern under the vessel. Looking from the bow towards the stern from under the vessel 100 the exterior fairing 202 of the present invention transducer modular mounting system can be seen integrated into the vessel hull 102 of the vessel 100.

Figure 2:
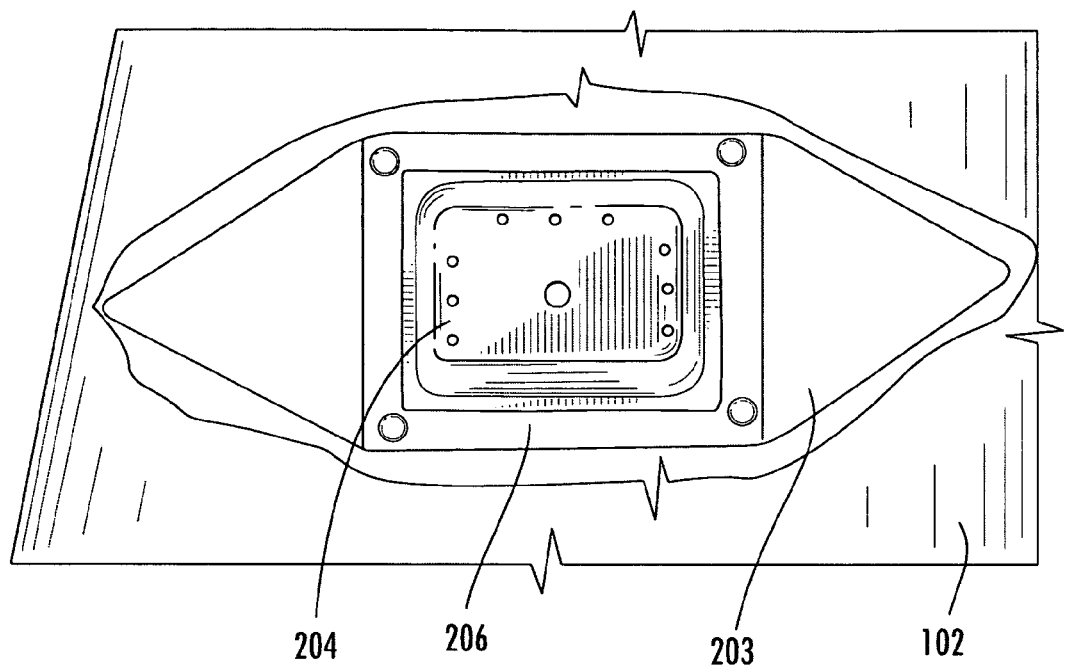
FIG. 2 is a close up view of a portion of the vessel hull showing the transducer modular mounting system looking from the bottom of the vessel up into the hull (with the transducer and support cage removed)

Referring to FIG. 2 there is shown a close up view of a portion of the vessel hull showing the transducer modular mounting system looking from the bottom of the vessel up into the hull (with the transducer and support cage removed). Looking from the bottom up into the vessel hull 102, with the transducer and support cage removed the exterior fairing 202 of the present invention transducer modular mounting system can be seen. The fairing 202 has a recessed lip 206 which enables the support cage to be flush with the fairing 202. Looking into the vessel hull 102 the interior housing 204 can be seen in which the support cage (not shown) and the transducer (not shown) sit.

Figure 3:
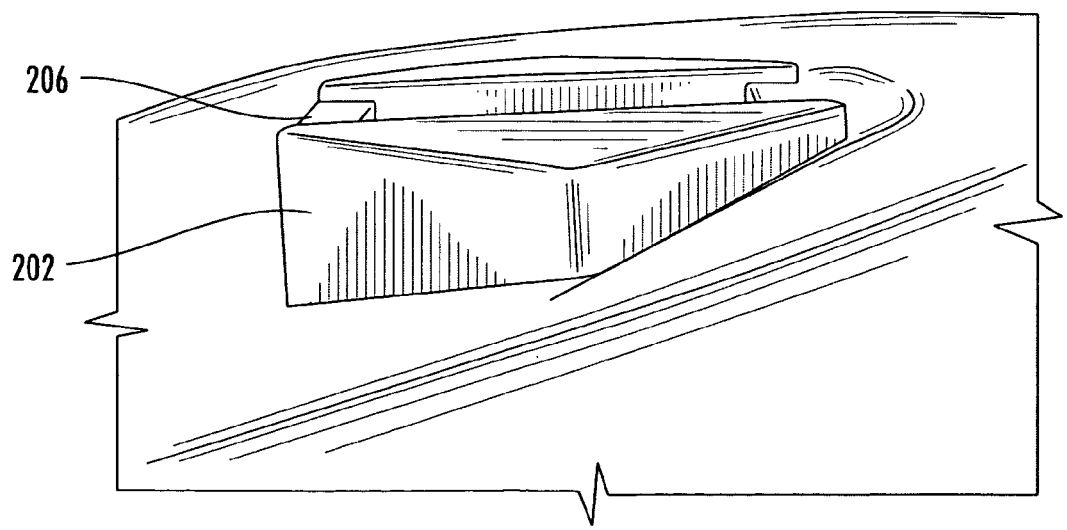
FIG. 3 is a close up view of a portion of the vessel hull showing the transducer modular mounting system looking from the bow towards the stern under the vessel (with the transducer and support cage removed)

Referring to FIG. 3 there is shown a close up view of a portion of the vessel hull showing the transducer modular mounting system looking from the bow towards the stern under the vessel (with the transducer and support cage removed). Looking from the bow towards the stern under the vessel 100 (with the transducer and support cage removed) the exterior fairing 202 of the present invention transducer modular mounting system can be seen integrated into the vessel hull 102. This results in the exterior fairing 202 being structurally integral to the hull. The recessed lip 206 which enables the support cage to be flush with the fairing 202 is also shown.

Figure 4:
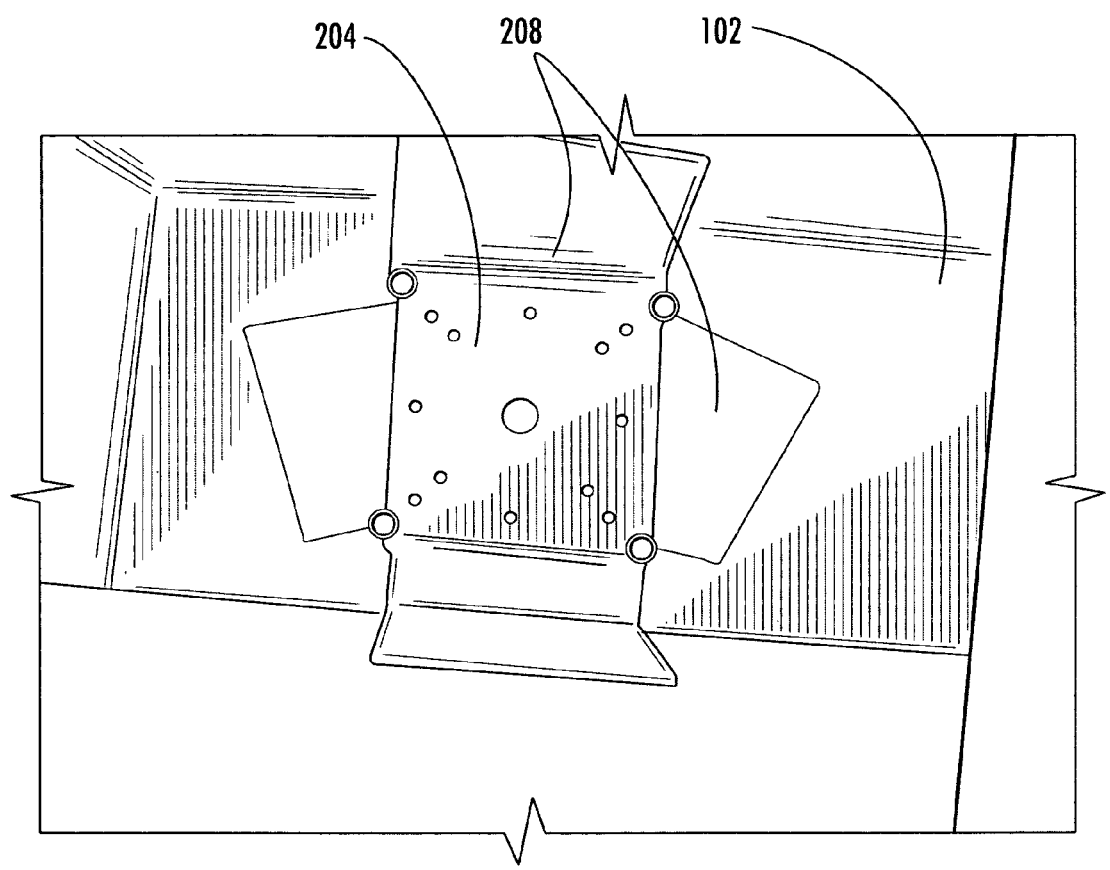
FIG. 4 is a close up view of a portion of the vessel hull showing the transducer modular mounting system looking from the top of the vessel down into the hull (with the transducer and support cage removed)

Referring to FIG. 4 there is shown a close up view of a portion of the vessel hull showing the transducer modular mounting system looking from the top of the vessel down into the hull (with the transducer and support cage removed). Looking from the top down into the vessel hull 102, with the transducer and support cage not installed, interior housing 204 can be seen which is bonded as an integral part to the vessel hull 102 by overlapping fiberglass sheets 208. This results in the interior housing being structurally integral to the hull.

Figure 5:
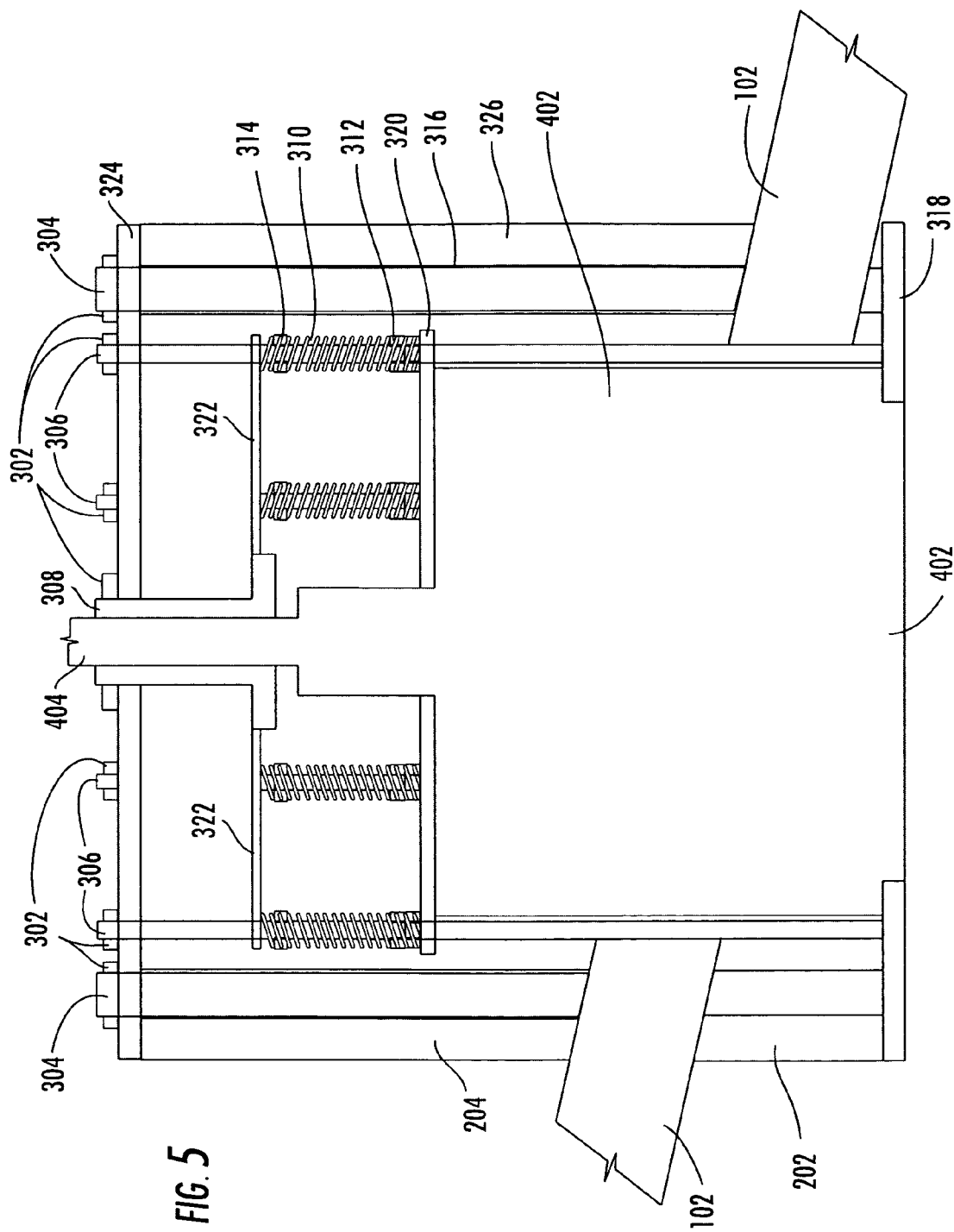
FIG. 5 is a cross sectional view of a portion of the vessel hull showing the transducer modular mounting system looking from the bow towards the stern under the vessel with the transducer and support cage installed.

Referring to FIG. 5 there is shown cross sectional view of a portion of the vessel hull showing the transducer modular mounting system looking from the bow towards the stern under the vessel with the transducer and support cage installed. The vessel hull 102 is shown with fairing 202 bonded in position and transducer 402 installed. Transducer cable 404 extends from transducer 402. The support cage 300 is shown with structural support bolts 304, transducer support bolts 306, retention nuts 302, stuffing tube 308, compression spring 310, slide bushing 312, limit nut 314, support guide tube 316, support plate 318, transducer retention plate 320, internal housing material 204, and thrust plate 322.

While the system is shown with simple compression springs 310, a combination of gas struts and springs in parallel as well as in series can be used. In addition to coil springs, leaf springs, and other suitable resilient materials can be used. The compression springs 310 can also be selected with a variable progressive spring constant.

Figure 6:
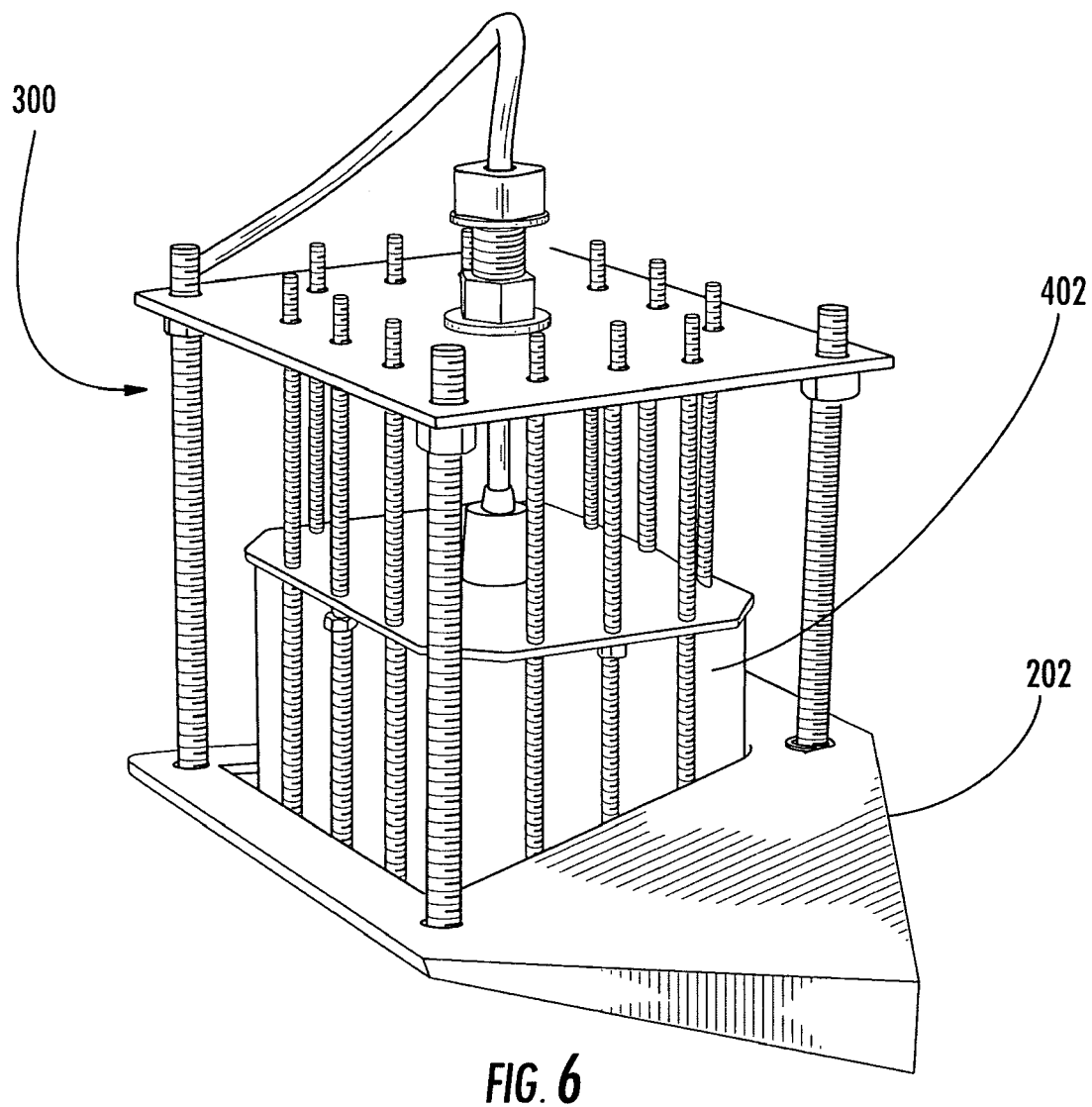
FIG. 6 is a close up view of the fairing with the transducer and support cage installed but not attached to the vessel hull.

Referring to FIG. 6 there is shown a close up view of the fairing 202 with the transducer and support cage installed but not attached to the vessel hull 102. The positioning of the support cage 300 and the transducer 402 can be seen as it would appear from the interior of the vessel 100 with the vessel hull 102 and the interior housing 204 not shown.

Figure 7:
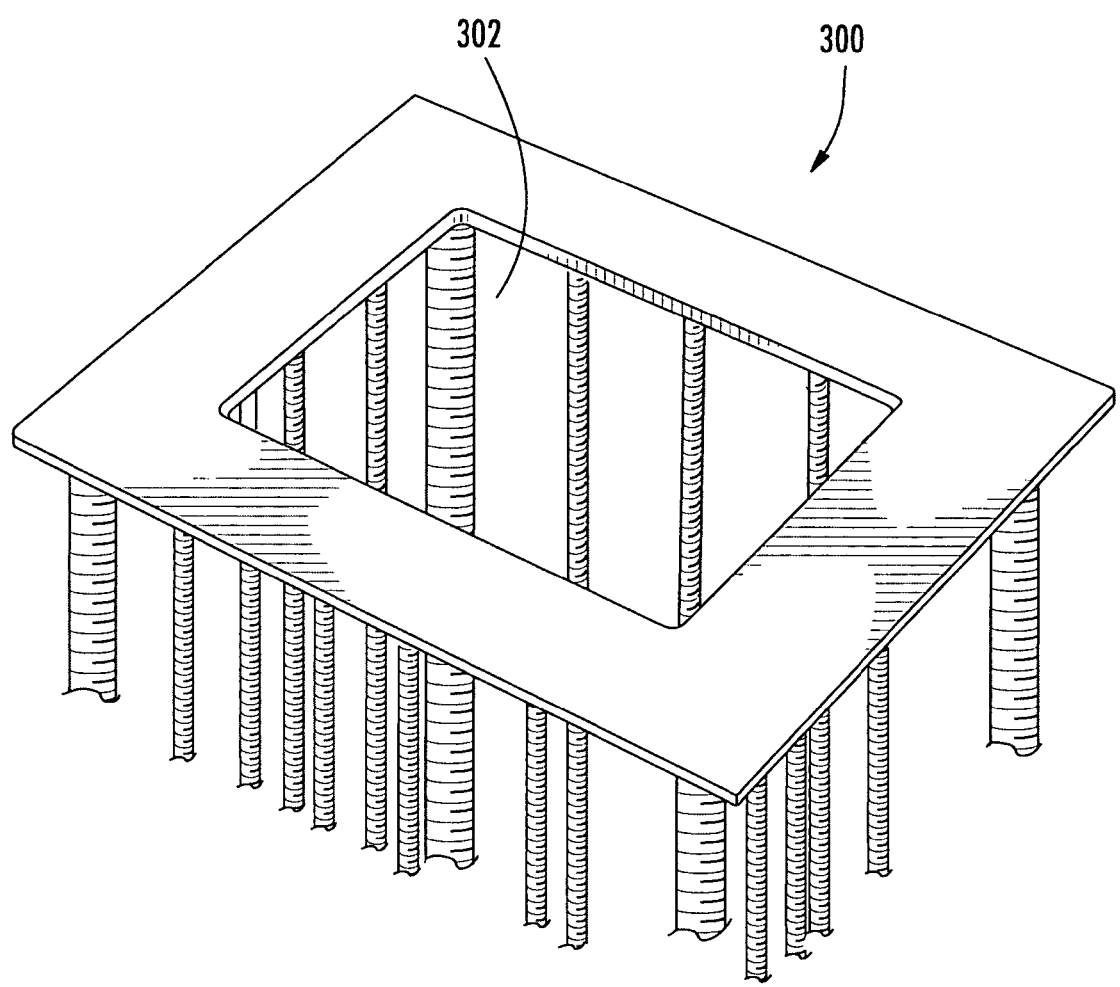
FIG. 7 is a close up perspective view of the bottom of the support cage.

Referring to FIG. 7 there is shown a close up perspective view of the bottom of the support cage 300 with transducer face opening 302. The support cage 300 can have a different transducer face opening 302 for different shaped transducers 402. Alternatively, the transducer face opening 302 can be fitted with an adapter (not shown) which reduces the size of the effective opening and/or changes the shape and geometry of the effective opening. This feature enables the use of a variety of different shape and size transducers 402 to be used when retro fitting and upgrading of the vessel 100.

Peak pressure resulting from the detonation of an explosive charge under water falls inversely with distance from the charge (see Shock and Detonation Waves, John G. Kirkwood, Gordan and Breach Science Publishers, 1967). TNT, Tritonal, Minol, Torpex, Tetryl, Torpex II, Minol II, DBX, various Pentanols and Pentolite are some of the energetic materials tested to establish pressure, time and distance relationships. For example, a 300 lb. charge of cast TNT with a radius of 11 inches generates an approximate absolute pressure of 1 long ton/sq. in. at a distance of 50 feet after a 0.71 millisecond decay time of initial detonation.

A thin plate supported between two fluids behaves under impact of an acoustic wave advancing in one of the fluids like a damped membrane under tension equal to the yield of the material. Damage produced by an exponential wave is proportional to its momentum. Only a fraction of momentum is effective. This fraction depends on the ratio of decay time of the wave to a "plastic time" of the plate. The "plastic time" is determined by the dimensions of the plate and the yield stress of the plate material. As long as the rate of strain is positive a plastic diaphragm behaves like a membrane under a constant tension equal to the product of its thickness and the yield of the material of which it is compressed.

When the rate of strain at the center of a diaphragm changes sign, an unloading wave is propagated to the edge, leaving the diaphragm with a permanent dish. Failure occurs if the maximum strain at the center exceeds a critical value, approximately equal to the rupture strain of the material in a linear tensile test. backing of the plate by a fluid of high density and high acoustic velocity diminishes plate damage.

The present invention transducer modular mounting system provides a "universal" mounting system that is built into the vessel hull at the time of manufacture, wherein one cage and housing geometry supports the majority of commercial and military transducers. The system allows maintenance and replacement of transducers without additional fiberglass and/or welding to the vessel hull 102. The system provides protection to the transducer 402 from mechanical and acoustic sources of damage (both military and commercial). The system is non-magnetic and provides over-pressure setting adjustability. The system is applicable both to fiberglass hulls and metal hulls.

Essentially, pressure generated from mechanical or acoustic sources acts against the transducer face. Acting as the center of a diaphragm, the transducer and its retaining plate begin dissipating energy by serial compression of the gas struts and the retainer springs. In parallel with this action, at a specific preset pressure, the transducer face or the transducer adapter plate (if one is used) to the cage main support plate will temporarily open to a maximum preset limit, allowing a stream of seawater to enter the hermetically sealed internal hull housing volume, compressing the volume of contained gas (initially at atmospheric pressure) to a pressure peak below the internal housing failure pressure limit. This is accomplished through the use of a fast acting, adjustable setting purge/relief value combination.

As the pressure decreases against the transducer face the junction between the transducer face or the transducer adapter plate (if one is used) and the cage main support plate will reseal watertight. The internal hull housing volume can then be purged of retained seawater. The purging can be accomplished through application of pressurized air or a gas such as nitrogen through the purge/relief valve.

The value of the spring constants and strut dampening coefficients for the compression springs 310, a combination of gas struts and springs in parallel as well as in series are selected so that the maximum impact sustained by the transducer will be below the level which would destroy it while they are selected suitably high to limit the breaching of the internal hull housing by sea water.

By using the transducer specifications, vessel hull specifications and explosive curves, based on a particular intended use of the vessel, the proper spring and strut combinations can be selected. Maximum transducer force pressure remains below that which would destroy it while minimizing seawater entry to the internal hull housing through the use of variable (progressive) spring force rates. The spring force combination is selected by determining the minimum radial distance the vessel will be allowed to enter from the anticipated source of detonation. This distance is relative to the (worst case) intensity (amount and type) of explosive contained within the explosive device and the structural properties of the vessel hull. These curves are known to exist (or can be determined as necessary) for the combination of vessels and explosive devices considered state of the art.

Figure 8:
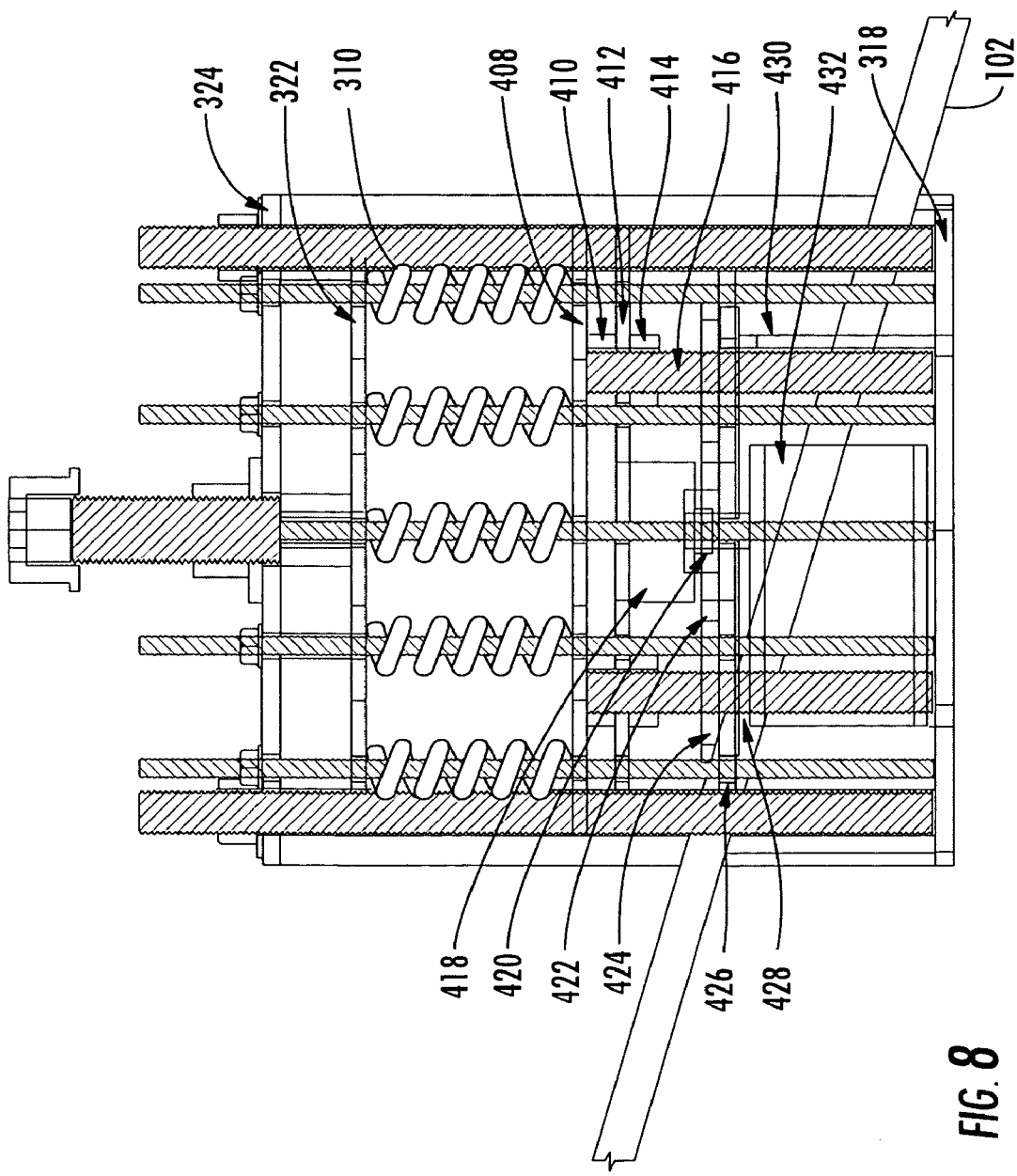
FIG. 8 is a cross sectional view of a portion of the vessel hull showing another embodiment of the transducer modular mounting system looking from the bow towards the stern under the vessel with the transducer and support cage installed; and, FIG. 9 is a drawing of a portion of the vessel hull showing another embodiment of the transducer modular mounting system looking from the top down into the hull.
Figure 9:
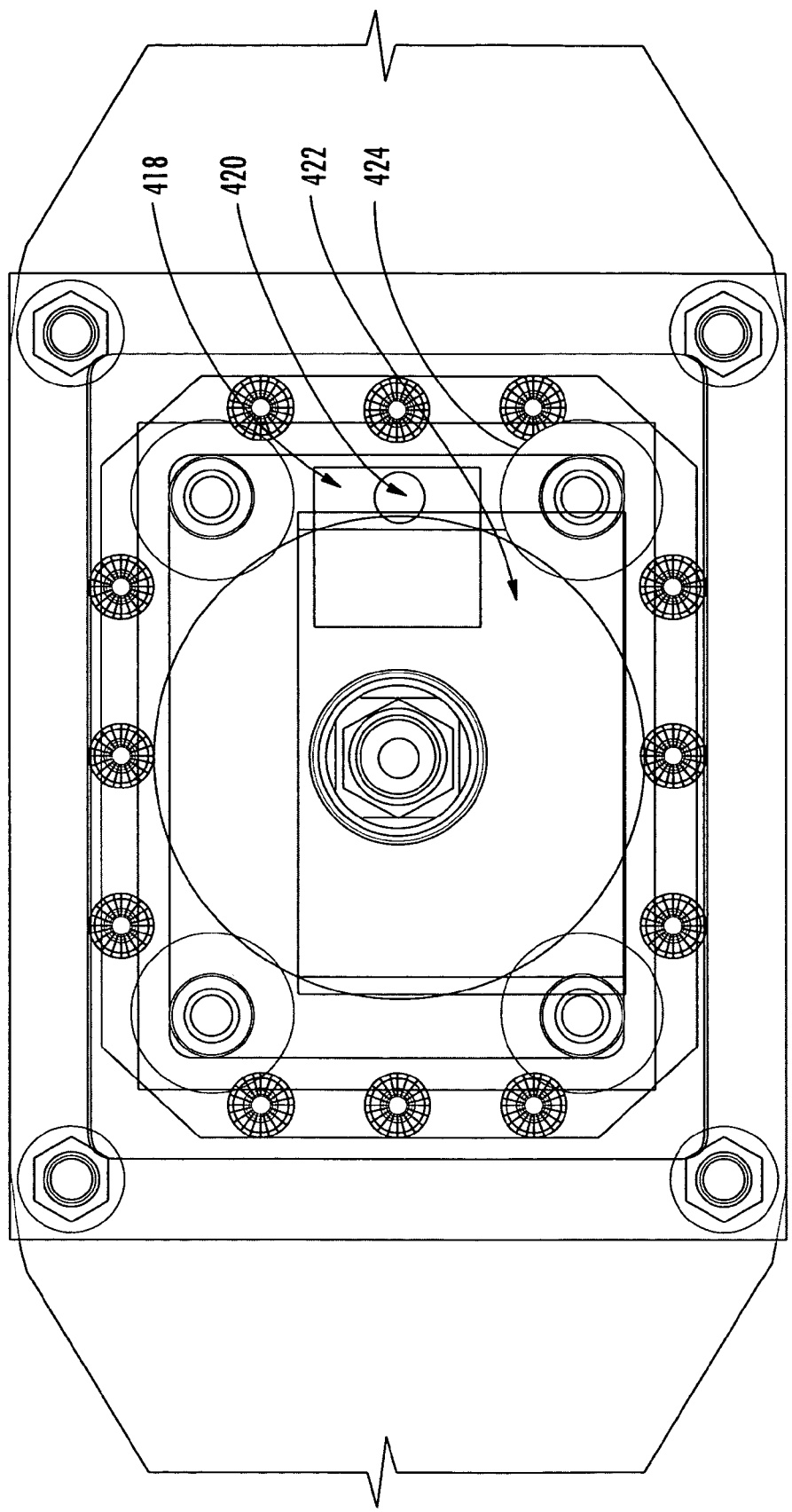

Referring to FIGS. 8 and 9 there is shown an alternative embodiment of the present invention. This alternative embodiment of the vessel hull transducer modular mounting system allows the use of side scan sonar (SSS), forward looking sonar, bottom scan sonar, 360° sweep sonar and searchlight sonar implementation (in both or either single deployment or phased array duplex modes) while maintaining the advantage of impact and concussion resistance to damage of the transducer arrays in both the extended and retracted positions.

Although the alternative embodiment of the present invention is particularly well suited for use with sonar transducers and is so described herein, it is equally well suited for other types of transducers and transducer arrays.

This allows for the use of high-speed surface craft in various modes of operation since in the retracted position the side scan housing is flush with the hull exterior fairing. Such craft are able to cover large distances in short times between searches while maintaining both high-resolution imaging capability and significant protection from impact and concussion damage.

When the 360° sweep housing, forward looking housing, or searchlight housing is fitted in lieu of the side scan housing module and operated in phased array mode a three-dimensional identification and analysis of threat conditions proximal to the vessel may be produced.

Referring to FIG. 8 there is shown a drawing in cross sectional view of a portion of the vessel hull showing the transducer modular mounting system looking from the bow towards the stern under the vessel with the transducer and support cage installed. Referring to FIG. 9 there is shown a drawing of a portion of the vessel hull showing the transducer modular mounting system looking from the top down into the hull.

Actual operation of the side scan and 360 sweep modules begins with energizing the gear-motor drive 418. Drive gear pinion 420 on the gear-motor turns the main drive gear 422. Main drive gear 422 turns the four planetary jackscrew fixed spur gears 424 which are a permanent (fixed) part of the jackscrew(s) 416.

Each of the four jackscrews 416 rotates in a fixed vertical axis and is held in this position by the jackscrew retention bearing 410 which is a permanent (fixed) component of the jackscrew retention bearing plate 408. The jackscrew retention bearing plate 408 is positioned by the compression springs 310, slide bushing 312, thrust plate 322 and limit nuts (not shown) in compression and by adjustment nuts 314 (not shown) in tension.

The rotation of jackscrew 416 synchronously moves jackscrew bearing 414 and side scan transducer array housing jackscrew bearing 428. The rotation of jackscrew bearings 414 and 428 drive the entire side scan module along the four jackscrews 416.

The side scan module movement (in deployment) places side scan transducer array housing 430 containing the side scan array housing cavity 432 for the transducer array with the attendant acoustic aperture below the hull fairing surface facing outboard of the vessel and perpendicular to the vessel direction of travel.

The side scan module movement (in retraction) places side scan transducer array housing 430 containing the side scan array housing cavity 432 for the transducer array with the attendant acoustic aperture above the hull fairing surface within the interior housing.

While the system is shown with simple compression springs 310, a combination of gas struts and springs in parallel as well as in series can be used as energy absorption devices. In addition to coil springs, leaf springs, and other suitable resilient materials can be used. The compression springs 310 can also be selected with a variable progressive spring constant.

Values for the spring constants and strut dampening coefficients may be adjusted specific to the vessel mission.

The base values to be used should be Impulse based, not bubble energy based and factored for both incident and normal energy transfer. Standard seawater molality and sets of empirical values (for a given temperature and shock wave velocity) from the published literature provide a significantly wide range of momentum transfer.

The surface area (in the retracted position) exposed to underwater shock has been held constant for all five configurations of the vessel hull transducer modular mounting system.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications, which come within the scope of the appended claims, is reserved.

What is claimed:

1. A vessel hull transducer modular mounting system for use with a vessel, having a hull with an interior area and an exterior area, and a transducer, the system comprising:
   a support cage mounted to the vessel hull;
   a support plate attached to said support cage, said support plate positioned on the exterior area of the hull;
   a transducer retention plate slidably coupled to said support cage;
   an energy absorption device coupled between said transducer retention plate and said support cage;
   wherein said transducer retention plate is biased by said energy absorption device to hold the transducer against said support plate;
   whereby the transducer can be replaced without necessitating further modification of the hull and shock impact on the transducer is reduced and dampened, thus maintaining integrity of the vessel hull during subsequent transducer replacements and extending the transducer life during shock impact.

2. The vessel hull transducer modular mounting system as recited in claim 1 further comprising a device for extending and retracting the transducer held against said support plate by said energy absorption device.

3. The vessel hull transducer modular mounting system as recited in claim 2 wherein said device for extending and retracting the transducer is a mechanical screw mechanism.

4. The vessel hull transducer modular mounting system as recited in claim 1 wherein said energy absorption device is at least one compression spring.

5. The vessel hull transducer modular mounting system as recited in claim 1 wherein said energy absorption device is at least one compression spring and at least one gas strut in parallel with said at least one compression spring.

6. The vessel hull transducer modular mounting system as recited in claim 1 wherein said energy absorption device is a resilient material.

7. The vessel hull transducer modular mounting system as recited in claim 4 wherein said at least one compression spring has a variable progressive spring constant.

8. A vessel hull with an integral transducer modular mounting system for use with a transducer comprising:
   a vessel hull having an exterior and an interior;
   a support cage mounted to said vessel hull;
   a support plate attached to said support cage, said support plate positioned on said exterior area of said vessel hull;
   a transducer retention plate slidably coupled to said support cage;
   an energy absorption device coupled between said transducer retention plate and said support cage;
   wherein said transducer retention plate is biased by said energy absorption device to hold the transducer against said support plate;
   whereby the transducer can be replaced without necessitating further modification of the hull and shock impact on the transducer is reduced and dampened, thus maintaining integrity of said vessel hull during subsequent transducer replacements and extending the transducer life during shock impact.

9. The vessel hull with an integral transducer modular mounting system as recited in claim 8 further comprising a device for extending and retracting the transducer held against said support plate by said energy absorption device.

10. The vessel hull with an integral transducer modular mounting system as recited in claim 9 wherein said device for extending and retracting the transducer is a mechanical screw mechanism.

11. The vessel hull with an integral transducer modular mounting system as recited in claim 8 wherein said energy absorption device is at least one compression spring.

12. The vessel hull with an integral transducer modular mounting system as recited in claim 8 wherein said energy absorption device is at least one compression spring and at least one gas strut in parallel with said at least one compression spring.

13. The vessel hull with an integral transducer modular mounting system as recited in claim 8 wherein said energy absorption device is a resilient material.

14. The vessel hull with an integral transducer modular mounting system as recited in claim 11 wherein said at least one compression spring has a variable progressive spring constant.

15. A method for retrofitted to an existing vessel hull, having a hull with an interior area and an exterior area, a transducer modular mounting system for a transducer, the method comprising the steps of:
   adapting the existing vessel hull for receiving a transducer modular mount;
   said transducer modular mount comprising:
      a support cage mounted to the vessel hull;
      a support plate attached to said support cage, said support plate positioned on the exterior area of the hull;
      a transducer retention plate slidably coupled to said support cage;
      an energy absorption device coupled between said transducer retention plate and said support cage;
   wherein said transducer retention plate is biased by said energy absorption device to hold the transducer against said support plate;
   whereby the transducer can be replaced without necessitating further modification of the hull and shock impact on the transducer is reduced and dampened, thus maintaining integrity of the vessel hull during subsequent transducer replacements and extending the transducer life during shock impact.

16. The method for retrofitted to an existing vessel hull as recited in claim 15 further comprising the step of extending and retracting the transducer held against said support plate by said energy absorption device.

17. The method for retrofitted to an existing vessel hull as recited in claim 16 wherein mechanical screwing extends and retracts the transducer.

18. The method for retrofitted to an existing vessel hull as recited in claim 15 wherein said energy absorption device is at least one compression spring.

19. The method for retrofitted to an existing vessel hull as recited in claim 15 wherein said energy absorption device is at least one compression spring and at least one gas strut in parallel with said at least one compression spring.

20. The method for retrofitted to an existing vessel hull as recited in claim 19 further comprising the step of adjusting spring constants and adjusting strut dampening coefficients for a specific vessel mission.

21. The vessel hull transducer modular mounting system as recited in claim 2 wherein said device for extending and retracting the transducer held against said support plate by said energy absorption device enables side scan mode transducer operation.

22. The vessel hull transducer modular mounting system as recited in claim 2 wherein said device for extending and retracting the transducer held against said support plate by said energy absorption device enables forward looking mode transducer operation.

23. The vessel hull transducer modular mounting system as recited in claim 2 wherein said device for extending and retracting the transducer held against said support plate by said energy absorption device enables bottom scan mode transducer operation.

24. The vessel hull transducer modular mounting system as recited in claim 2 wherein said device for extending and retracting the transducer held against said support plate by said energy absorption device enables sweep mode transducer operation.

25. The vessel hull transducer modular mounting system as recited in claim 2 wherein said device for extending and retracting the transducer held against said support plate by said energy absorption device enables searchlight mode transducer operation.

* * * * *